H. LEMP.
POWER GENERATING SYSTEM.
APPLICATION FILED MAR. 13, 1906.
910,331.
Patented Jan. 19, 1909.
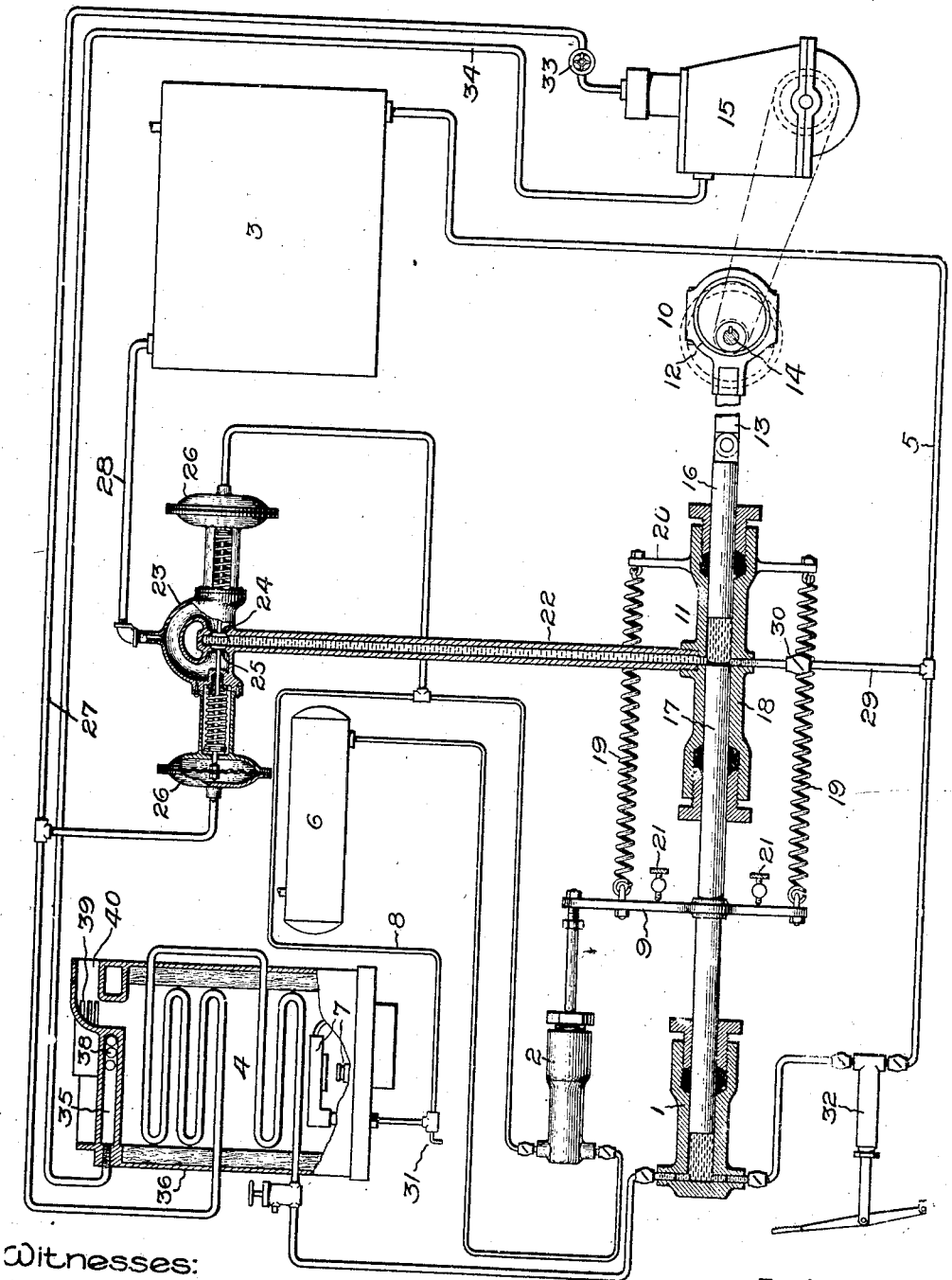
Witnesses:
Marcus L. Byng
Helen Orford
Inventor
Hermann Lemp,
By Albert G. Davis
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

POWER-GENERATING SYSTEM.

No. 910,331.     Specification of Letters Patent.     Patented Jan. 19, 1909.

Application filed March 13, 1906. Serial No. 305,900.

*To all whom it may concern:*

Be it known that I, HERMANN LEMP, a citizen of the United States, residing at Lynn, county of Essex, State of Massachusetts, have invented certain new and useful Improvements in Power-Generating Systems, of which the following is a specification.

My invention relates to steam generating apparatus particularly applicable to self-propelled vehicles, although certain features of the invention are adaptable to other uses.

It has for its object to provide an improved system of this character which is reliable and efficient in operation.

In carrying the invention into practice, I employ a generator, a burner for heating it, and pumps for supplying water and fuel, respectively, to the generator and burner. The pumps are driven by a suitable motor through a variable stroke mechanism of special design. This mechanism comprises what I term a "hydraulic clutch" which is adapted to be automatically controlled by a suitable agency to vary the strokes of the pumps in such a manner that the supplies of water and fuel will be changed, and hence the generation of steam, in accordance with the demand.

In the accompanying drawing, which illustrates one embodiment of the invention, is shown diagrammatically my improved system adapted for use in automobiles.

Referring to the drawing, 1 represents the water pump and 2 the fuel pump which are respectively connected with and supply water from the tank 3 to the generator 4, through the supply pipe 5, and fuel from the tank 6 to the burner 7 through the pipe 8. The generator is of a type comprising a coil of pipe and is heated by the burner, which, as shown in the present case, is of the kerosene vapor jet type. The pistons of the pumps are mechanically connected by a crosshead 9 and are driven by a motor 10 through a hydraulic clutch 11; the latter constituting a variable stroke mechanism. The motor comprises an eccentric and its strap 12 which impart motion to the movable element of the clutch through the rod 13 (partly broken away). The eccentric is usually mounted on the driving axle of the vehicle. This is shown in section at 14. The engine 15 for propelling the vehicle is geared or otherwise connected with the shaft so that the latter and hence the eccentric rotates with the same speed as the wheels of the vehicle. This means the speed of the pumps is directly dependent upon the speed of the vehicle and correspondingly increases or decreases with the latter.

The hydraulic clutch comprises a driving and a driven element 16 and 17, respectively, preferably in the form of plungers, the first being hinged to the eccentric rod and the second for the sake of simplicity being a continuation of the plunger of the water pump. The crosshead 9 is rigidly mounted upon this combined plunger. The clutch plungers extend into the casing 18 of the clutch from opposite ends thereof and are suitably packed to prevent waste of the hydraulic medium. This liquid medium acts as a means for transmitting motion from the driving to the driven plunger. The driving plunger acts in only one direction on the plunger 17 so that the latter is required to be returned by an independent motor, such for instance as one or more extension springs 19, each connected to the crosshead at one end and to the stationary abutment 20 on the clutch casing at the other end. The return stroke of the driven element and the pumps is limited by the adjustable stops 21 arranged to engage the crosshead. The plunger of the fuel pump is connected to the crosshead through a lost-motion connection which is adjustable so as to obtain the proper ratio between the deliveries of the pumps. In order to vary the clutch action or effective transmission of motion through the clutch, provision is made for varying the volume of active liquid in the clutch. This is done by means of a controlled outlet through which more or less of the liquid can be displaced during the driving stroke, and the remaining portion serves to transmit motion to the driven member: in other words, when no liquid is permitted to be displaced all of the liquid in the clutch is effective and the stroke of the driven element is the same as that of the driving element. As the outlet is opened there is a slip or lost-motion between the elements which varies from minimum to maximum as the valves are moved from full closed to full open position.

Attached to the casing 18 is a column 22 which is branched at its upper end, and communication between the branches 23 is controlled by independent puppet valves 24 and 25. These valves are each controlled by a pressure regulator 26 of the diaphragm type, one being connected to the fuel pump to be responsive to fuel pressure and the other connected to the steam pipe 27 leading to the engine to be responsive to changes in steam pressure. From the branches 23 the liquid displaced through the valves is preferably returned to the clutch so as to prevent waste. This may be accomplished in several ways, but by preference the liquid is returned by way of the water tank 3 and the supply pipe 5, the branches 23 being connected with the water tank through the pipe 28 and the clutch connected with the supply pipe 5 through the pipe 29. In the latter pipe is an inwardly opening check valve 30 which permits the water to be drawn into the clutch to compensate for the amount that may have been displaced in the preceding power stroke and also prevents the water from being returned from the clutch to the supply pipe during the power stroke of the driving member. The column 22, pipe 28, water tank 3, and pipes 5 and 29 thus constitute a bypass around the clutch whereby liquid is immediately returned to the latter whenever any has been displaced. If desired the pipes 28 and 29 may be directly connected to form the bypass, but by arranging the parts as above described, the operation of the clutch is rendered dependent upon the flow of liquid through the supply pipe as hereinbefore explained.

The pump 2 supplies fuel to the burner during working conditions, but for starting up the burner and for maintaining the flame in banked condition, as when the vehicle is standing, or the strokes of the pumps become zero, the burner may be supplied by the tank 6 which is preferably placed under a small initial air pressure. In closing down the system the supply of fuel is cut off by means of the valve 31. In starting up the system the supply of water is obtained by means of a foot pump 32 arranged in the supply pipe 5, but in place of this or in connection therewith, an accumulator may be used as set forth in my prior applications.

The supply of steam to the engine is controlled by a throttle 33. The exhaust steam from the engine may be used to create forced draft on a burner so that as the demand for steam by engine is increased or diminished the draft is correspondingly increased or decreased. To create the forced draft on the burner the exhaust steam is conveyed by means of the pipe 34 to a preheating chamber 35 which forms the top of the boiler casing 36. The steam which is heated in this chamber discharges into a down draft flue through the openings 38 thereby drawing off the products of combustion through the openings 39. When the vehicle is standing, or when it is moving and the supply of steam of the engine is cut off, as when coasting, the products of combustion pass off to the atmosphere through the natural draft flue 40.

The valves of the hydraulic clutch are so set that during normal load conditions one or both are partially opened; this means that the strokes of the pumps are less than maximum since the clutch is not operating at its full capacity. Should the load on the vehicle increase, for any reason, the increased demand for steam and the decrease in speed tend to decrease respectively the steam pressure and fuel pressure (the latter being dependent upon the speed of the pump). Under these conditions the clutch valves close to a greater extent so that less liquid from the clutch is displaced and consequently the strokes of the pumps increase to cause the generation of steam to accelerate and the pressure thereof to be maintained substantially constant irrespective of the increase in demand. Should the load decrease, as in descending a hill or encountering a better stretch of road, the demand for steam is less so that the pressure of the latter tends to increase, as does also the pressure of the fuel due to the increase in speed of the fuel pump. The clutch valves are then opened to a greater extent and more liquid displaced in the clutch so that the strokes of the pumps are shortened and the effective deliveries thereof decreased to meet the different conditions. It will thus be seen that with a system of the character above proposed the control of the vehicle, so far as the supply system is considered, is entirely automatic in operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A supply system for vapor generating apparatus, comprising a generator, a burner for heating the same, means for feeding liquid to the generator and fuel to the burner, an actuator, a connection between the actuator and said means including a lost motion device, and means controlled by the pressure of the fuel supplied to the burner which regulates the interruption of the transmission of energy from the actuator to said feeding means by the lost motion device and varies the supplies of both fuel and liquid.

2. A supply system for vapor generating apparatus, comprising a generator, a burner for heating the same, means for feeding liquid to the generator and fuel to the burner in suitable proportions, a constantly moving actuator, a connection between the actuator and said means including a lost motion device, and means controlled by the pressure of the fuel supplied to the burner which regulates the interruption of the transmission of motion from the actuator to said means by the lost motion device and varies both the fuel and liquid supplies while maintaining said proportionate relations of the supplies.

3. A supply system for vapor generating apparatus, comprising a generator, a burner for heating the same, a pump for supplying liquid to the generator, a pump for supplying fuel to the burner in suitable proportion to the liquid supply, an actuator for the pumps including a lost motion connection, and a device controlled by the pressure of the fuel supplied to the burner which regulates the lost motion connection to simultaneously vary the effective deliveries of the pumps.

4. A supply system for vapor generating apparatus, comprising a generator, a burner for heating the same, a pump for supplying liquid to the generator, a pump for supplying fuel to the burner, a motor for driving the pumps, means for transmitting motion from the motor to the pumps including a lost motion connection, and a device subject to the pressure of the fuel supplied by the fuel pump for controlling said connection to vary the effective delivery of the liquid pump.

5. A supply system for vapor generating apparatus, comprising a generator, a burner for heating the same, a pump for supplying liquid to the generator, a pump for supplying liquid to the burner, a mechanism for driving the pumps which comprises a lost motion device for varying the strokes thereof, and means subject to the pressure of the fuel supplied to the burner for controlling said device to decrease the strokes of the pumps as the fuel pressure increases or vice versa.

6. A supply system for vapor generating apparatus, comprising a generator, a burner for heating the same, means for feeding liquid to the generator and fuel to the burner, an actuator for said means including a lost motion mechanism, and a device controlled by the pressure of the fuel supplied to the burner and by the pressure of the vapor in the generator for regulating the lost motion mechanism to vary the supplies of both the fuel and liquid.

7. A supply system for vapor generating apparatus, comprising a generator, a burner for heating the same, a pump for supplying liquid to the generator, a pump for supplying fuel to the burner, a motor for driving the pumps, means connecting the motor and the pumps, and a device subject to the pressure of the fuel supplied by the pump and to the pressure of the vapor in the generator for controlling said means to vary the effective delivery of the liquid pump.

8. A supply system for vapor generating apparatus, comprising a generator, a burner for heating it, means for supplying fuel to the burner, a pump for supplying liquid to the generator, a variable stroke mechanism for driving the pump, and a regulating device for said mechanism which is controlled by the pressure of the fuel supplied to the burner for regulating the stroke of the liquid pump.

9. A supply system for vapor generating apparatus, comprising a generator, a burner for heating it, means for supplying fuel to the burner, a pump for supplying liquid to the generator, a variable stroke mechanism for driving the pump, and a regulating device for said mechanism which is controlled by the pressure of the fuel supplied to the burner and by the pressure of the vapor in the generator for governing the stroke of the pump.

10. A supply system for vapor generating apparatus, comprising a generator, a burner for heating it, a fuel tank arranged to supply fuel under a definite low pressure for maintaining the flame in banked condition, a pump connected with the tank for supplying fuel to the burner during normal operation, a pump for supplying liquid to the generator, and a variable stroke mechanism for the pumps which is controlled by the pressure of the fuel supplied to the burner.

11. A supply system for steam generating apparatus, comprising a generator, a burner for heating it, pumps for supplying liquid and fuel respectively to the generator and burner, an engine receiving vapor from the generator and adapted to operate at a variable speed, a variable stroke mechanism for the pumps which is driven by the engine, and a device for governing the said mechanism which is controlled by the pressure of the fuel supplied to the burner.

12. A supply system, comprising a pump, an apparatus arranged to receive the liquid discharged by the pump, a driving member, and a controllable body of fluid between the movable element of the pump and the member whereby the latter acts through the fluid to impart motion to the said element.

13. A supply system, comprising a pump, an apparatus arranged to receive the liquid discharged by the pump, a motor having a constant stroke, a body of inelastic fluid interposed between the movable element of the pump and the motor through which the latter imparts motion to the former, and means for varying the effective volume of said fluid body to introduce lost motion between the element and motor.

14. A supply system, comprising a pump, an apparatus arranged to receive the liquid discharged by the pump, a constant stroke motor, and a hydraulic clutch mechanism between the motor and the movable element of the pump, which is composed of a plunger connected with the motor, a second plunger connected with the pump, a casing for the said plungers, a mobile medium between the plungers through which one drives the other, and means for varying the volume of said medium so that the effective movement of the driven plunger can be varied.

15. A supply system, comprising a pump, an apparatus receiving the liquid discharged by the pump, a constant stroke motor, and a hydraulic clutch mechanism between the motor and the movable element of the pump, which is composed of a plunger connected with the motor, a second plunger connected with the pump, a casing for the said plungers, a mobile medium between the plungers through which one drives the other, and means for varying the volume of said medium controlled by the pressure of the fluid delivered by the pump to vary the effective movement of the driven plunger.

16. A supply system, comprising a pump, an apparatus receiving the liquid discharged by the pump, a motor, and a hydraulic clutch mechanism between the pump and motor which is composed of a driving and a driven plunger, a casing for both, a body of fluid in the casing interposed between the plungers, and a valve controlled conduit through which a variable amount of fluid discharges from the casing during one stroke of the driving plunger and returns during the other stroke for varying the effective transmission of motion through the clutch.

17. A supply system, comprising a pump, an apparatus receiving the liquid discharged by the pump, a motor, and a clutch mechanism between the motor and pump which is composed of a constant stroke driving plunger connected with the motor, a variable stroke driven plunger connected with the pump, a casing for the plungers, a body of liquid between the plungers through which the driving plunger imparts motion to the other in one direction, and means for moving the driven plunger in the opposite direction.

18. A supply system, comprising a pump, an apparatus receiving the liquid discharged by the pump, a motor, and a clutch mechanism between the motor and pump which is composed of a constant stroke driving plunger connected with the motor, a variable stroke driven plunger connected with the pump, a casing for the plungers, a body of liquid between the plungers through which the driving plunger imparts motion to the other in one direction, means for moving the driven plunger in the opposite direction, and a controlled conduit connected with the casing through which fluid is displaced during the power stroke of the driving plunger and returned during the return stroke of said plunger.

19. A supply system, comprising a pump, an apparatus receiving the liquid discharged by the pump, a liquid containing tank, a supply connection between the tank and pump, a hydraulic clutch mechanism for imparting motion to the pump from the motor which is composed of a driving and a driven plunger, a casing for the plungers, a body of liquid interposed between the plungers, a conduit between the casing and tank, and a valve regulated by the pressure of the fluid delivered by the pump for controlling the discharge of liquid from the casing and varying the effective transmission of motion from the driving to the driven plunger.

20. A supply system, comprising a pump, an apparatus receiving the liquid discharged by the pump, a motor, a hydraulic clutch mechanism between them which is composed of a driving and a driven member, a casing for both, a body of fluid in the casing interposed between the members, a conduit through which fluid may be displaced from between the members to vary the effective strokes thereof, and a plurality of automatically controlled regulators in said conduit.

21. A supply system, comprising a pump, an apparatus receiving the liquid discharged by the pump, a motor, a hydraulic clutch mechanism between them which is composed of a driving and a driven member, a casing for both, a body of fluid in the casing interposed between the members, a conduit through which fluid may be displaced from between the members to vary the effective strokes thereof, a plurality of valves for independently controlling the amount of fluid displaced, actuators for the valves, and means for supplying fluid to the casing to replenish the amount displaced.

22. A supply system, comprising a pump, an apparatus receiving the liquid delivered by the pump, a source of supply therefor, a motor for driving the pump, a hydraulic clutch between the pump and motor composed of a plunger driven by the motor, a second plunger driven by the first, a casing for the plungers, a body of liquid in the casing interposed between the plungers, a conduit through which liquid from the casing is displaced to vary the effective strokes of the plungers, a plurality of independently actuated valves in the conduit through which liquid passes from the casing, regulators for the valves, and a conduit common to all the valves which receives the fluid discharged therefrom and conveys it to said source of supply.

23. A supply system, comprising a pump, an apparatus receiving the liquid delivered by the pump, a source of supply therefor, a motor for driving the pump, a hydraulic clutch between the pump and motor composed of a plunger driven by the motor, a second plunger driven by the first, a casing for the plungers, a body of liquid in the casing interposed between the plungers, a conduit through which liquid from the casing is displaced to vary the effective strokes of the plungers, a plurality of independently actuated valves in the conduit through which liquid passes from the casing, regulators for the valves, a conduit common to all the valves which receives the fluid discharged therefrom and conveys it to said source of supply, and a connection between the said source and the casing through which liquid flows to the latter to replenish the amount displaced therefrom.

24. A supply system, comprising a plurality of pumps, a motor therefor, a hydraulic clutch between the pumps and motor whereby the strokes of the pumps may be varied with respect to the strokes of the motor, and a plurality of regulators for the clutch which are each connected with an independent pump to be controlled by the pressure of the delivery thereof.

25. In a supply system, the combination of a pump, an apparatus receiving the liquid discharged by the pump, a source of liquid supply, a motor for the pump, and a hydraulic clutch between the pump and motor whereby the strokes of the pump may be varied, the clutch and said source being so related that when the supply from the source to the pump is interrupted, the clutch becomes inoperative.

26. In a supply system, the combination of a generator, a burner for heating it, pumps for supplying liquid and fuel respectively to the generator and burner, sources of supply for the pumps, a motor for the pumps, and a hydraulic clutch between the motor and the pumps whereby the strokes of the latter may be varied, said clutch being so related to one of said sources and its pump that when the supply is interrupted the clutch becomes inoperative.

In witness whereof, I have hereunto set my hand this tenth day of March, 1906.

HERMANN LEMP

Witnesses:
JOHN A. McMANUS, Jr.,
HENRY O. WESTENDARP.